UNITED STATES PATENT OFFICE

HERMAN ALEXANDER BRUSON, OF PHILADELPHIA, PENNSYLVANIA, ASSIGNOR TO RÖHM & HAAS COMPANY, OF PHILADELPHIA, PENNSYLVANIA

MIXED ESTER OF BENZOPHENONE-POLY CARBOXYLIC ACID

No Drawing.      Application filed March 10, 1931. Serial No. 521,508.

This invention relates to esters of naturally occurring resin acids, notably the acids of colophony or wood rosin and is a continuation in part of Serial No. 432,552, filed March 1st, 1930. More especially it relates to mixed glyceryl esters of these acids and certain ketonic acids of the general formula

HOOC—R—CO—R'—COOH wherein R and R' are each aromatic nuclei; an example of this class being benzophenone-dicarboxylic acid,

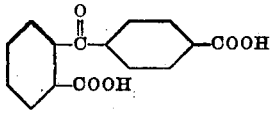

One object of the present invention is to prepare new, extremely high melting, water resistant compounds which are suitable for use in coating compositions. Another object of this invention is to raise the melting point of colophony, from approximately 60–80° centrigrade to a melting point of over 105° centrigrade, in order to obtain very hard, benzol-soluble resins that possess low solvent retention qualities, and which, in the form of coating compositions, lacquers, etc., dry hard rapidly, thereby permitting rubbing and polishing within a short time after application.

It has heretofore been known that the simple glyceryl esters of rosin or abietic acid, regardless of how they may have been prepared, are relatively low melting resins; that is to say they possess melting points ranging from about 70° C. to 105° C. depending upon the manner of condensation employed. It is also known that benzol-soluble condensation products of rosin with phthalic anhydride and glycerol may be prepared and that other polybasic acids such as maleic, succinic, malic, tartaric may be used in place of phthalic acid in such condensations (U. S. Pat. 1,098,776—Arsem). It has been recognized however that such products possess several disadvantages, especially poor waterproofness and low melting point.

Apparently the causes for the poor waterproofness and the low melting points are due to the nature of the polybasic acids heretofore employed for the condensation. These acids for example, are themselves relatively low melting compounds and appreciably water soluble as compared to the benzophenone-dicarboxylic acids which we propose to use. Furthermore the glycerides of the polybasic acids heretofore employed, are not very stable towards heat or moisture as compared with the glycerides of the benzophenone-dicarboxylic acids. When condensed in open kettles with rosin and glycerol the polybasic acids or their anhydrides heretofore used, notably phthalic acid, readily sublime out at the high temperatures required for the condensation, thereby leaving an excess of unreacted or partially esterified glycerol in the final resin, thus cutting down its water-proofness. If attempts are made to correct this loss from sublimation by adding an excess of polybasic acid, the final resin obtained reacts acid and is also not waterproof. Furthermore the temperature required for the esterification of the phthalic anhydride heretofore used, is considerably lower than that required for the esterification of the rosin, so that uncombined resin is always present at temperatures below 240° C. at which temperature esterification of the phthalic anhydride is taking place rapidly. In addition to these difficulties it has not been possible by the previous processes to obtain mixed esters with rosin which are readily soluble in hydrocarbons and which at the same time possess melting points substantially in excess of 105° centigrade. If attempts are made to increase the melting point above this figure, it is found that the proportion of the polybasic acid-glycerol component must be increased over that of the rosin to such a degree that the solubility of the final resin in aromatic hydrocarbons such as benzol or toluol, is lost, thereby making the resin expensive to manufacture and expensive to use, since only costly solvents such as butyl acetate or ethyl acetate can be employed to dissolve it. At the same time an excess of the polybasic acid-glycerol component over the rosin leads to the formation of a heat reactive resin which had a tendency to become insoluble in all reagents, especially at elevated temperatures.

Marked improvements result if the polybasic acid used is itself water resistant, high melting, stable and non-sublimable at the temperatures required for condensation and if relatively small quantities of said polybasic acid are required to raise the melting point of rosin to 120° centigrade or thereabouts, at the same time retaining solubility in benzol or toluol and giving stability at high temperatures to the final resin.

In accordance with the following invention I have, after considerable experimentation with very many different types of acids, found that polybasic acids containing a plurality of aromatic groups and a ketonic group, meet all of the above requirements. We have especially found ketonic acids of the general formula HOOC—R—CO—R′—COOH wherein R and R′ are aromatic nuclei, to be particularly effective for this purpose, and in particular the acid known as benzophenone-2:4-dicarboxylic acid,

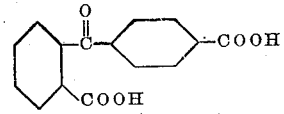

such as is obtained by the oxidation of paratoluyl-ortho-benzoic acid by means of an alkaline permanganate solution.

It thus now becomes possible to prepare mixed esters of resin acids having high solubility in hydrocarbons and melting points in excess of 105° C. comparable in hardness with the natural fossil gums, extremely water resistant and soluble and compatible in nitrocellulose lacquers.

As illustrating my invention, the following examples are given:

Example 1

The following mixture is placed in a suitable kettle and heated.

75 grams benzophenone-2:4′-dicarboxylic acid (melt. point 235° C.)
180 grams rosin
37 grams glycerol (99%)

The heating is at first conducted at 110° C. until foaming ceases and is then gradually increased until the melt reaches 250–255° C. The mass is heated at this temperature until a sample when removed from the kettle is clear and completely soluble in two parts of toluol. This requires about three hours with the above batch. The resin thus produced is soluble in ethyl acetate, butyl acetate, toluol, benzol, and acetone, but insoluble in 95% ethyl alcohol. Its melting point is 105–113° C.

Example 2

A mixture consisting of 75 grams benzophenone-2:4′-dicarboxylic acid, 150 grams rosin, and 35 grams glycerol is heated as described above to 250° C. After 4½ hours at this temperature a benzol-soluble resin melting at 120–130° C. is obtained. It is advantageous to carry out the condensation in an atmosphere of nitrogen or carbon dioxide in order not to darken the resin by oxidation in the air.

Example 3

A mixture of 75 grams benzophenone-2:4′-dicarboxylic acid, 120 grams rosin and 33 grams glycerol were heated as described in Example 1 for five hours at 255° C. until completely soluble in two parts of toluol. The resin possessed a melting point of 130–140° C.

As the amount of rosin is diminished there is a tendency for the resin to become correspondingly harder and higher melting. If the rosin is left out entirely, and only sufficient glycerol is used to combine with the benzophenone dicarboxylic acid a very hard reactive type resin is obtained which upon further heating becomes insoluble and difficultly fusible. It possesses considerably greater waterproofness than the glyptals heretofore available.

In place of the benzophenone-2:4′-dicarboxylic acid, any of the isomeric benzophenone-dicarboxylic acids may be used as above in like proportions. These include Benzophenone-4:4′-dicarboxylic acid (melting point above 360° C.)
Benzophenone-3:4′-dicarboxylic acid (melting point 326° C.)
Benzophenone-2:2′-dicarboxylic acid.

as well as those benzophenone-dicarboxylic acids in which both carboxyl groups are on the same aromatic nucleus. For practical purposes however, benzophenone-2:4′-dicarboxylic acid gives satisfactory results, even though the 4:4′ and the 3:4′ acids give still higher melting resins.

In place of the benzophenone-dicarboxylic acids, higher carboxylated derivatives of diaryl-ketones such as for example benzophenone-2,4,2′-tricarboxylic acid of melting point 247–248° C. (as prepared by oxidizing 2,4-dimethyl benzoyl-o-benzoic acid with alkaline potassium permanganate) may be used.

Example 4

A mixture of:

314 gr. benzophenone-2,4,2′-tricarboxylic acid
155 gr. glycerol
500 gr. colophony is gradually heated during a 3 hour period to 250° C. with stirring in an atmosphere of carbon dioxide gas and held at 250° C. until a resin soluble in toluol and melting above 120° C. is obtained. This requires about 5½ hours.

Example 5

A mixture of:
314 gr. benzophenone-2,4,2'-tricarboxylic acid

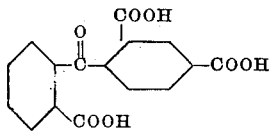

62 gr. ethylene glycol
92 gr. glycerol
300 gr. rosin is gradually heated at 200° C. for about 5 hrs. The temperature is then raised to 250° C. and kept thereat for 8 hours longer. A hard, benzol-soluble resin melting above 110° C. is obtained.

Example 6

370 gr. crude dinaphthyl ketone-2,2'-dicarboxylic acid

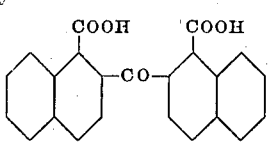

which is obtained by the oxidation of 2,2'-dimethyl-dinaphthyl ketone is heated with 540 gr. rosin and 126 gr. glycerol at 250° C. for about 8 hours until a hard resin melting above 120° C. is obtained.

Example 7

The di-[biphenyl-ketone]-dicarboxylic acid,

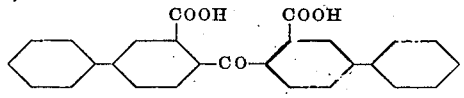

which may be obtained by oxidizing 2,2'-dimethyl di-[biphenyl-ketone]

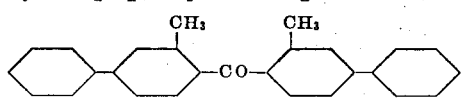

with alkaline potassium permanganate solution is heated with twice its weight of rosin or other acidic gum such as manila copal and one half its weight of glycerol at 250° C. until a hard resin melting above 130° C. and soluble in toluol, is formed. This required about 6 hours at 250° C.

Although the preferred form of my invention described the use of glycerol as the esterifying alcohol, I do not desire to be so limited. Other polyhydric alcohols such as ethylene glycol, tri methylene glycol, mannitol, diethylene glycol, tri ethylene glycol, polyglycerol, and the like may be used in whole or in part to replace the glycerol. The melting point of the resins thus obtained are in general higher than those obtained from the same molecular proportions of the acids and alcohols heretofore employed. Furthermore in place of rosin, other natural acidic gums, such as the copals may be used.

It is evident to those skilled in the art, that various minor modifications may be made in carrying out the above reactions without departing from the scope of the invention. For example, the rosin or other natural acidic gum and the polyhydric alcohol may be heated together first to give an ester which may subsequently be condensed with the diaryl ketone-polycarboxylic acid; or the polyhydric alcohol and the acid may be heated together at first to produce a partially esterified material which may subsequently be completely esterified upon further heating with the rosin. Moreover the condensation may be carried out in vacuo to remove the water as fast as formed with or without the use of dehydrating catalysts such as calcium oxide and the like.

All diaryl-ketone-polycarboxylic acids other than those specifically mentioned herein may be used. Examples are those in which R and R' are anthracene, naphthalene, diphenyl, xylene, toluene, cymene, nuclei. R and R' may be the same or different. However the high cost of preparing such compounds precludes their use for other than research purposes, I have found the benzophenone-dicarboxylic acids especially the -2,4' and the 4,4'- acid to be the most suitable for the general condensations described herein. A larger number of carboxyl groups may also be present as for example in

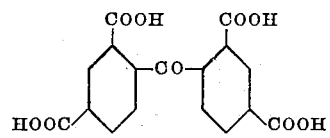

benzophenone-tetracarboxylic acid, or its isomers such as are obtained by oxidizing dixylyl ketone. In employing polycarboxylated acids of the types described above it is advantageous to use sufficient polyhydric alcohol or mixtures of polyhydric alcohols to completely neutralize all of the carboxyl groups present both in the ketonic acid and in the acidic gum. This quantity may be calculated from the equivalent weights and acid numbers. The quantity of rosin or other acidic gum may be varied within wide limits. In general however, the quantities shown in the examples are suitable for most purposes. Temperatures higher or lower than those specified may be used but 220°–260° C., is a practical working range.

What I claim is:

1. The process of preparing a resin which comprises heating to reaction temperature a mixture of a natural acidic gum, a polyhydric alcohol, and a polycarboxylated diaryl ketone of the type R—C(=O)—R' where R and R' are aromatic nuclei.

2. The process of preparing a resin which comprises heating to reaction temperature a mixture of colophony, a polyhydric alcohol, and a polycarboxylated diaryl ketone of the type R—C(=O)—R' where R and R' are aromatic nuclei.

3. The process of preparing a resin which comprises heating to reaction temperature, a mixture of colophony, glycerol and a polycarboxylated diaryl ketone of the type R—C(=O)—R' where R and R' are aromatic nuclei.

4. The process of preparing a resin which comprises heating to reaction temperature, a mixture of colophony, a polyhydric alcohol and a benzophenone-polycarboxylic acid.

5. The process of preparing a resin which comprises heating to reaction temperature, a mixture of colophony, a polyhydric alcohol, and a benzophenone-dicarboxylic acid.

6. The process of preparing a resin which comprises heating to reaction temperature, a mixture of colophony, glycerol and benzophenone-2,4'-dicarboxylic acid.

7. A process of preparing a resin which comprises heating to reaction temperature an acidic gum and a polyhydric alcohol, then condensing this ester with a polycarboxylated diaryl ketone of the type R—C(=O)—R' where R and R' are aromatic nuclei.

8. A process in which the polyhydric alcohol and the ketone mentioned in claim 7 are heated to form a partially esterified material, then the esterification is completed by heating with an acidic gum.

9. A composition of matter comprising a mixed ester of a polyhydric alcohol, a natural acidic gum and a polycarboxylated diaryl ketone of the type R—C(=O)—R' where R and R' are aromatic nuclei.

10. A composition of matter comprising a mixed ester of a polyhydric alcohol, colophony, and a polycarboxylated diaryl ketone of the type R—C(=O)—R' where R and R' are aromatic nuclei.

11. A composition of matter comprising a mixed ester of glycerol, colophony, and a polycarboxylated diaryl ketone of the type R—C(=O)—R' where R and R' are aromatic nuclei.

12. A composition of matter comprising a mixed ester of a polyhydric alcohol, a natural acidic gum and a benzophenone-polycarboxylic acid.

13. A composition of matter comprising a mixed ester of a polyhydric alcohol, a natural acidic gum and a benzophenone-dicarboxylic acid.

14. A composition of matter comprising a mixed ester of glycerol, a natural acidic gum and a benzophenone-dicarboxylic acid.

15. A composition of matter comprising a mixed ester of a polyhydric alcohol, colophony, and a benzophenone-dicarboxylic acid.

16. A composition of matter comprising a mixed ester of glycerol, colophony and benzophenone-2,4'-dicarboxylic acid.

17. A composition of matter comprising a mixed ester of glycerol, colophony and benzophenone-4,4'-dicarboxylic acid.

In testimony whereof I affix my signature.

HERMAN ALEXANDER BRUSON.